(12) United States Patent
Wang et al.

(10) Patent No.: US 6,773,797 B1
(45) Date of Patent: *Aug. 10, 2004

(54) EXTRUDED POLY (ETHYLENE OXIDE) AND FILLER COMPOSITES AND FILMS HAVING ENHANCED DUCTILITY AND BREATHABILITY

(75) Inventors: James H. Wang, Appleton, WI (US);
David M. Schertz, Roswell, GA (US);
Dave A. Soerens, Neenah, WI (US);
Vasily A. Topolkaraev, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,818

(22) Filed: Oct. 20, 1999

Related U.S. Application Data

(60) Provisional application No. 60/114,211, filed on Dec. 29, 1998.

(51) Int. Cl.⁷ .................................................. B32B 5/22
(52) U.S. Cl. ..................... 428/317.9; 428/220; 428/338; 428/339; 428/315.5; 428/325; 428/330; 428/331; 428/311.31; 210/500.36; 210/500.27
(58) Field of Search ............................. 428/317.9, 220, 428/338, 339, 315.5, 325, 330, 331; 210/500.36, 500.23

(56) References Cited

U.S. PATENT DOCUMENTS

| | | | |
|---|---|---|---|
| 3,895,155 A | | 7/1975 | Shkuri |
| 4,100,238 A | * | 7/1978 | Shinomura .................... 264/49 |
| 4,276,339 A | | 6/1981 | Stoveken |
| 4,554,181 A | | 11/1985 | Cousin et al. |
| 4,592,954 A | | 6/1986 | Malhotra |
| 4,865,914 A | | 9/1989 | Malhotra |
| 4,902,553 A | | 2/1990 | Hwang et al. |
| 5,075,153 A | | 12/1991 | Malhotra |
| 5,244,714 A | | 9/1993 | Malhotra et al. |
| 5,508,072 A | * | 4/1996 | Andersen et al. .......... 428/34.5 |
| 5,565,503 A | * | 10/1996 | Garcia et al. ................ 523/124 |
| 5,670,448 A | | 9/1997 | Kometani |
| 5,672,424 A | | 9/1997 | Malhotra et al. |
| 5,683,793 A | | 11/1997 | Malhotra et al. |
| 5,709,976 A | | 1/1998 | Malhotra et al. |
| 5,865,926 A | * | 2/1999 | Wu et al. .................... 156/229 |
| 6,057,061 A | * | 5/2000 | Callahan et al. ............ 429/129 |
| 6,096,213 A | * | 8/2000 | Radovanovic et al. . 210/500.36 |
| 6,117,438 A | * | 9/2000 | Topolkaraev et al. ....... 424/404 |
| 6,172,177 B1 | * | 1/2001 | Wang et al. ................. 528/271 |
| 6,268,048 B1 | * | 7/2001 | Topolkaraev et al. .... 428/304.4 |

* cited by examiner

*Primary Examiner*—Elizabeth M. Cole
*Assistant Examiner*—Hai Vo
(74) *Attorney, Agent, or Firm*—Brinks Hofer et al.; G. Peter Nichols

(57) ABSTRACT

Breathable, flushable, porous films and articles made therewith and a process for making these films. The present invention is directed to composites comprising a polymer that is water-soluble or water-degradable and a filler. The films are made by extruding the composite materials into a precursor film and, preferably, stretching the precursor film to achieve the desired breathability and water-dispersibility of the finished film. In one embodiment, the composition of the invention comprises a polymer of ethylene oxide and a filler such as calcium carbonate.

16 Claims, 4 Drawing Sheets

EXTRUDED POLY (ETHYLENE OXIDE) AND FILLER COMPOSITES AND FILMS HAVING ENHANCED DUCTILITY AND BREATHABILITY

This application claims the benefit of provisional application No. 60/114,211, filed Dec. 29, 1998.

FIELD OF THE INVENTION

The present invention relates to breathable and flushable compositions and porous films and articles therefrom and a process for making these films. More particularly, the present invention relates to composites comprising a polymer that is water-soluble or water-degradable and a filler. In one embodiment, the composition of the invention comprises a polymer of ethylene oxide and a filler such as calcium carbonate.

BACKGROUND OF THE INVENTION

Disposable products have revolutionized modern lifestyle and are of great convenience to society. Such products generally are relatively inexpensive, sanitary and quick and easy to use. Disposal of such products, however, increasingly is a problem as landfills close and incineration contributes to urban smog and pollution. Consequently there is an urgent need for disposable products that can be disposed of without dumping or incineration. An ideal disposal alternative would be the use of municipal sewage treatment and private residential septic systems. Products suited for disposal in sewage systems that can be flushed down a conventional toilet are termed "flushable." An essential feature of flushable products is that they must have sufficient strength for their intended use, yet lose structural integrity upon contact with water.

Numerous attempts have been made to produce flushable fibers, fabrics, films and adhesives that retain their integrity and wet strength in the presence of body waste fluids, yet can be disposed of via flushing in conventional toilets. One approach to producing a flushable product is to limit the size of the product so that it will readily pass through plumbing without causing obstructions or blockages. Such products have high wet strength and do not disintegrate during flushing. Examples of this type of product include wipes such as baby wipes. This approach to flushability suffers the disadvantage, however, of being restricted to small articles.

Another approach to producing a flushable product is to manufacture a product that is normally insoluble in water, but which disintegrates in the presence of alkaline or acidic aqueous solutions. The end user is provided with an alkaline or acidic material to add to the water in which the product is to be disposed. This approach permits disposal via normal plumbing systems of products substantially larger than wipes, but suffers from the disadvantage of requiring the user to perform the step of adding the dissolving chemical to the water. A further disadvantage is that the inadvertent or intentional disposal of such a product in a conventional toilet without the addition of the dissolving chemical can cause serious obstruction or blockage of the plumbing system. The latter disadvantage can, however, be overcome by incorporating the dissolving acid or alkali into the article but separate from the dissolvable material while in use. The dissolving chemical is only released upon contact with water during flushing.

Similarly, another approach to producing a flushable product, particularly wipes, consists of forming the product from a pH-sensitive gelled polymer, and storing the product in the presence of a separate acidic solution. When the wipe is placed in a large quantity of neutral pH water, it disintegrates as a result of the pH shift. A disadvantage of this pH shift approach to flushability is that some acidic polymers lose wet strength at slightly alkaline pH in the range of 7–8. Because the pH of urine may be as high as 8.5, these flushable materials are not well suited for use in, for example, diapers or incontinence pads.

Another approach to producing a flushable product is to form the product from material that is susceptible to attack by specific enzyme catalysis that breaks down the structural integrity of the material. In such a product the enzymes may be introduced into the disposal water separately. These systems suffer many of the same disadvantages as those described above for alkaline or acid treatable materials.

It has been proposed to dispose of these products in municipal and private sewage systems. Ideally, these products would be flushable and degradable in conventional sewage systems. The term "flushable" as used herein means that the article is suited for disposal in sewage systems by flushing down through a conventional toilet. Disposal by flushing provides the additional benefit of providing a simple, convenient and sanitary means of disposal. However, while capable of being flushed, these personal care products must also have sufficient strength during use to provide the desired function for which they were designed. Personal care products should be able to withstand the elevated temperature and humidity conditions encountered during use and storage. However, to be flushable, they should lose integrity upon contact with water in the toilet.

Additionally, many disposable articles do not take into account the comfort of the user. Many of these articles use thermoplastic polymers which do not have high water vapor transmission rates and therefore do not have good breathability. It is desirable that these personal care products be breathable in order avoid the build-up of perspiration and increase the level of comfort of the wearers of these products. By increasing the breathability of the films, the skin wellness of the user is also increased since water vapor can pass through the film and article away from the skin and not be trapped against the skin, causing possible rashes or other skin maladies. Therefore, a breathable material having mechanical integrity when dry yet readily disintegrates upon immersion in water is highly desirable.

Due to its unique interaction with water and body fluids, poly(ethylene oxide) (hereinafter PEO) is currently being considered as a component material in flushable products. PEO,

is a commercially available water-soluble polymer that can be produced from the ring opening polymerization of the ethylene oxide,

Because of its water-soluble properties, PEO is desirable for flushable applications. However, PEO films are not highly breathable, as needed for personal care products, and are difficult to process using conventional processing techniques.

Prior art references have attempted to overcome these difficulties. U.S. Pat. No. 4,902,553 to Huang et al. discloses disposable articles comprising a liquid impermeable, vapor permeable film comprising a crystallizable, stretched polyolefin-based film and a rattle-reducing additive which may be polyethylene oxide. However, the liquid impermeable, vapor permeable films of U.S. Pat. No. 4,902,553 require at least one nucleating agent which may be talc or calcium carbonate. The amounts of nucleating agent are limited to very small amounts, 0.05 to 5 percent by weight. These amounts of inorganic nucleating agent are insufficient to be defined as fillers. Further, stretching is required to generate porosity and hence breathability and subsequent leaching of the rattle-reducing agent is the result. Additionally, these polyolefin films are not water-degradable and are therefore not useful in flushable applications. In contrast, the films of the present invention are based on a water-soluble or water-degradable polymer and not non-water-soluble and non-water-degradable polyolefins. The films of the present invention do not require a nucleating agent or a crystallizable polyolefin. Additionally, the films of the present invention may incorporate larger amounts, greater than 5 weight percent, of various filler(s).

U.S. Pat. No. 3,895,155 discloses coated, transparent plastic articles. The transparent plastic may comprise poly(ethylene oxide). An inorganic, protective coating is applied as a separate layer over the transparent plastic article to improve surface hardness, increase stretch resistance, and facilitate non-fogging. The inorganic, protective coating may comprise various metal oxides. However, the coating forms a separate, discrete, glass-like layer from the transparent plastic article and the resulting coating and articles are not breathable or flushable.

U.S. Pat. Nos. 5,075,153, 5,244,714, and 5,672,424 to Malhotra et al. disclose multilayered or coated recording sheets designed for electrostatic printing processes. The recording sheets comprise a base sheet with an anti-static layer which may be made from poly(ethylene oxide). The recording sheets comprise an additional toner receiving layer which comprises inorganic oxides such as silicon dioxide, titanium dioxide, calcium carbonate, or the like. The poly(ethylene oxide) and inorganic oxides are contained in separate layers, the anti-static layer and the toner receiving layer respectively. Therefore, the recording sheets are not breathable or flushable.

U.S. Pat. No. 4,276,339 to Stoveken describes a laminated product comprising a paper layer and a foamed layer. Poly(ethylene oxide) is described as one of many possible components of an aqueous dispersion of latex from which the foamed layer is made. Fillers such as clay or silica are suggested as possible additions to the aqueous dispersion of latex in order to increase the solids content and density of this aqueous dispersion. The aqueous dispersion from which the foamed layer is made must be foamed to be breathable. The present invention is drawn to breathable films that are not foamed. Additionally, there is no disclosure that the laminated product disclosed in Stoveken is flushable.

Thus, currently available PEO films are not practical for breathable, flushable personal care applications. What is needed in the art, therefore, are porous, breathable, flushable films and articles which overcome the difficulties set forth above, and methods of producing these breathable, flushable films and articles.

SUMMARY OF THE INVENTION

The invention discloses composites comprising a water-soluble or water-degradable polymer and at least one filler. Films made from the compositions disclosed herein have increased porosity, thereby increasing the breathability and flushability of the films. The polymer component forms the matrix of the composite. Desirably, the water-soluble or water-degradable polymer is a polymer or copolymer of ethylene oxide. Desirably, the filler is selected from clays, calcium carbonate or mixtures thereof. When the selected filler is calcium carbonate, it is also possible to surface treat the calcium carbonate with a liquid organosilicone having a Hydrophilic-Lipophilic Balance (HLB) number ranging from about 6 to about 12. In one embodiment, the polymer is a poly(ethylene oxide) and the clay filler is from the smectite group. Desirable clay fillers include montmorillonites and bentonites, for example sodium montmorillonite. In another embodiment, polyethylene oxide is grafted with one or more polar vinyl monomers.

Key variables that effect the microstructure of the composites of the invention include: filler particle size distribution, surface activity of the filler which may be modified and molecular weight and selection of the polymer. Preferably, the filler particles have an average particle size of less than about 10 microns. More preferably, the filler particles have an average particle size of less than about 5 microns. Even more preferably, the filler particles have an average particle size of less than about 1 micron. Smaller particle sizes provide improved dispersion and processability.

The composites of the present invention possess unique, porous structures. Films comprising the composites of the invention have enhanced breathability and water dispersibility. Such composites and stretched films comprising such composites are especially useful for flushable applications and are useful for making flushable articles such as flushable diapers, feminine pads, pantiliners, and training pants.

DETAILED DESCRIPTION OF THE INVENTION

Figure 1:
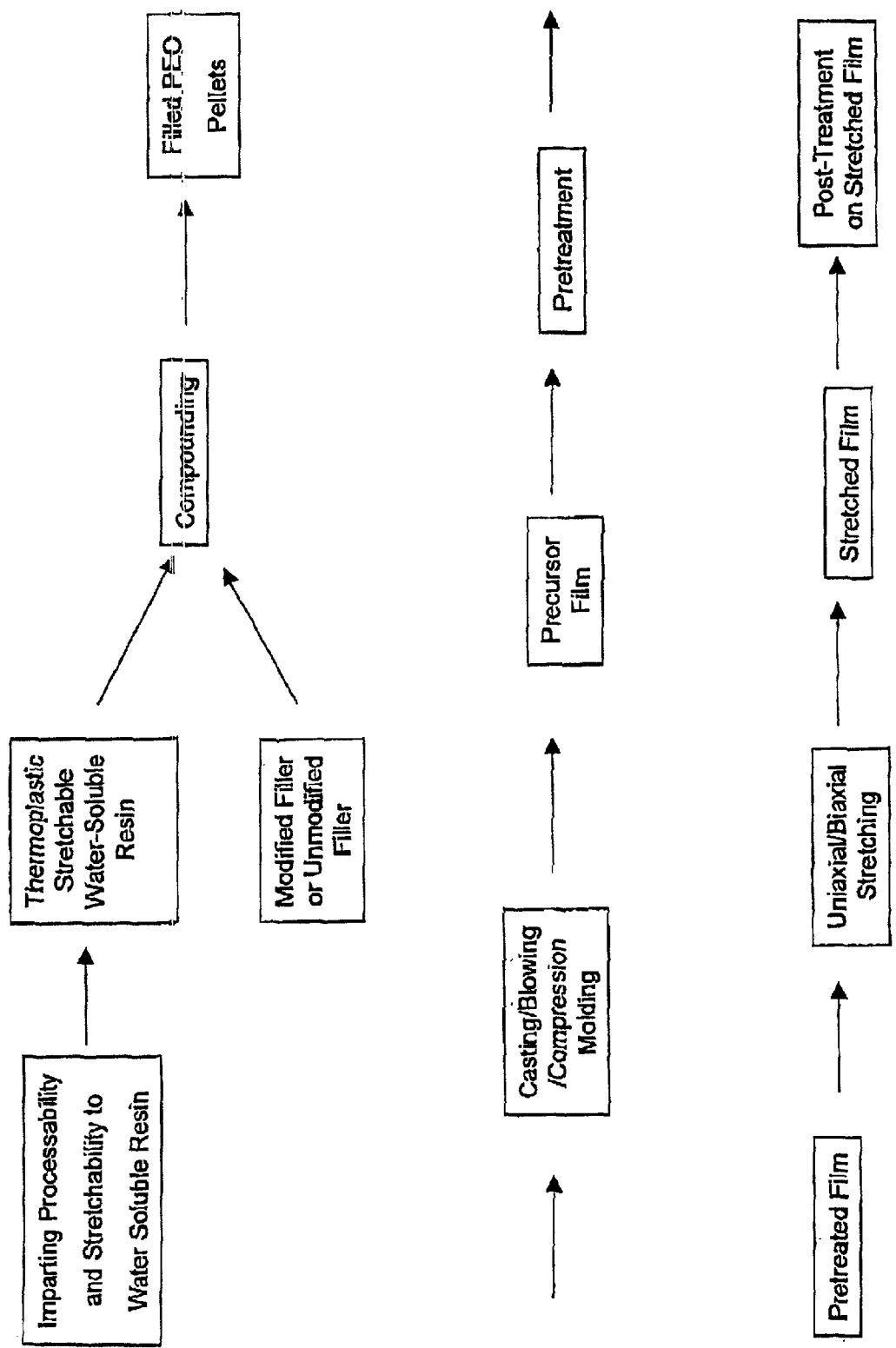
FIG. 1 shows a process diagram for forming the porous, flushable, ductile, breathable films of the present invention.

The present invention is directed to composites comprising a water-soluble or water-degradable polymer and a filler. The composites may be used to make films having enhanced ductility, breathability and water-dispersibility. These composite films are porous, will disperse when placed in water and are useful in the preparation of flushable personal care articles such as diapers, feminine pads, pantiliners and training pants, among others.

The films made using the composites of the present invention are flushable. By "flushable" it is meant that the film either becomes water-dispersible, water-disintegratable or water-weakenable such that the film may be flushed down a conventional toilet into a septic tank or public sewer system. By "water-dispersible" it is meant that the film dissolves or breaks into pieces smaller than a 20 mesh after being immersed in water for approximately five minutes. By "water-disintegratable" it is meant that the film breaks into multiple pieces within five minutes of immersion in water and that some of the pieces will be caught by a 20 mesh screen without slipping through. By "water-weakenable" it is meant that the composition remains in one piece but weakens and loses rigidity after five minutes of immersion in water and becomes drapeable, i.e. it bends without an external force applied thereto when it is held by one side at a horizontal position. The term "water-stable" means that the composition does not become drapeable after five minutes of immersion in water and remains in one piece after being immersed in water for five minutes.

Aspects of the present invention include a flushable porous film which has been produced from a precursor film layer comprising from about 90 to about 10 percent by weight of a water-soluble resin and from about 10 to about 90 percent by weight of a filler material. The precursor film is sufficiently stretchable to provide an elongation-at-break of about 150% or greater, and more preferably about 200% or greater. The precursor film layer is also breathable and preferably has a water vapor transmission rate (WVTR) of at least about 500 g/m$^2$/24 hours, and preferably at least about 1000 g/m$^2$/24 hours. The precursor film is the layer of a film material prior to stretching or other operations employed to generate the porous structure within the final film layer.

The composites of the present invention are useful in the formation of films having increased breathability and water-dispersibility. The films formed from the composites have increased porosity caused by admixing the components, forming a precursor film and then stretching the precursor film to create a porous film structure. The pores in the stretched film increase the water vapor transmission rate for the film and, hence, its breathability.

Many personal care articles made today use polyolefin films. In general, polyolefin films are not breathable and provide a water vapor barrier, having a WVTR of less than about 100 g/m$^2$/24 hours. The addition of a filler to these polyolefin films will actually reduce WVTR to less than about 80 g/m$^2$/24 hours. Some water vapor transmission may be generated in polyolefin films by adding a filler and stretching to generate polyolefin films which typically have a water vapor transmission rate of about 1000 to about 2500 g/m$^2$/24 hours. Poly(ethylene oxide) films have higher water vapor transmission rates compared to polyolefin films, but these films are still limited by their structure and have a water vapor transmission rate of about 1000 to about 2000 g/m$^2$/24 hours, depending on film thickness. Again, by adding a filler, the WVTR will drop to between about 500 to about 1500 g/m$^2$/24 hours as the filler reduces the area through which water may be transmitted. However, to keep skin dry and healthy, a personal care article is desired to have a water vapor transmission rate of at least about 3500 g/m$^2$/24 hours, and preferably about 4500 g/m$^2$/24 hours. The films of the present invention are capable of satisfying these desired water vapor transmission rates.

Additionally, the increased porosity of the films of the present invention enhances the rate of their water-dispersibility. By increasing the porosity, there is an increase in the surface area of the film which may be contacted with water when the film is placed in a conventional toilet. More water, therefore, is able to contact the water-soluble polymer portion of the film, thereby causing the film to lose some or all of its integrity faster, thereby permitting the film to be transported in a conventional waste water treatment or septic system. Therefore, there will only be a short wait time prior to flushing the film after the film or article has been placed in a toilet. This improves the in-use convenience of the material.

The composites of the present invention are made using a water-soluble or water-degradable polymer. The water-soluble polymer component of the composite forms a continuous phase or matrix for the composite. The selection of the water-soluble polymer is based on consideration of key variables such as water solubility, average molecular weights, melt processability, strength and ductility. Preferably, the water-soluble polymer comprises a polymer of ethylene oxide. As used herein, the term "polymer" includes homopolymers, copolymers, terpolymers and modifications thereof. Such water-soluble polymers include, but are not limited to, polymers of ethylene oxide, particularly homopolymers and modified homopolymers of ethylene oxide. Even more preferably, the water-soluble polymer is poly(ethylene oxide) ("PEO"). Preferably, the PEO is in the form of high molecular weight PEO resins. The PEO resins useful for this invention preferably have a molecular weight from greater than 200,000 g/mol to about 8,000,000 g/mol. Although high molecular weight PEO resins are desirable for mechanical and physical properties, low molecular weight PEO resins provide the best balance between the mechanical/physical properties and the film-forming properties. As a result, the more preferred range of molecular weights of PEO resins ranges from about 200,000 g/mol. to about 1,000,000 g/mol. However, while PEO is the preferred water-soluble polymer, the composite films of the present invention may also use other water-soluble polymers.

Commercial PEO resins having a molecular weight higher than 600,000 g/mol have poor melt processability in both filler compounding and in film extrusion. This causes high melt pressure and the resulting films have severe melt fracture. Films thinner than 8 mils cannot be obtained. Therefore, the unmodified PEO resins have limited utility in making thin breathable films. Thin films are desired for personal care product applications due to better flexibility of the material and reduced finished product weight and cost.

To resolve these problems, it was discovered that chemically modified PEO resins are especially useful and preferred for the breathable flushables used in the film applications of the present invention. One example of modified PEO resins useful in the present invention are the modified PEO resins set forth in U.S. Ser. No. 09/002,197, the disclosure of which is incorporated in its entirety herein. These PEO resins have been modified by grafting a polar vinyl monomer onto the PEO. These modified PEO resins have lower molecular weights than the unmodified high-strength PEO resins useful in the present invention. However the modified PEO resins have lower melt viscosities, higher melt strengths and higher melt elasticity than the unmodified low-strength PEO resins, thereby allowing the formation of very thin films of thickness about 1 mil. When used in conjunction with the present invention, the resulting composites are able to be used to produce very thin, porous films having high degrees of breathability, flushability and ductility. The grafting modification method imparts stretchability to the PEO resin as compared to unmodified PEO resin (See FIG. 1).

A variety of polar vinyl monomers may be useful in the practice of this invention. Monomer(s) as used herein includes monomers, oligomers, polymers, mixtures of monomers, oligomers and/or polymers, and any other reactive chemical species which is capable of covalent bonding with the parent polymer, PEO. Ethylenically unsaturated monomers containing a polar functional group, such as hydroxyl, carboxyl, amino, carbonyl, halo, thiol, sulfonic, sulfonate, etc. are appropriate for this invention and are desrable. The polar vinyl monomer may be selected from the group of acrylates, methacrylates, 2-hydroxyethyl acrylate, 2-hydroxyethyl methacrylate, poly(ethylene glycol) acrylates, poly(ethylene glycol) methacrylates, poly(ethylene glycol) diacrylates, acrylic acid, methacrylic acid, maleic an hydride, itaconic acid, acrylamide, glycidyl methacrylate, 2-bromoethyl acrylate, 2-bromoethyl methacrylate, carboxyethyl acrylate, sodium acrylate, 3-hydroxypropyl methacrylate, 3-hydroxypropyl acrylate, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) acrylates, poly(propylene glycol) methacrylates 2-propene-1-sulfonic acid and its sodium salt, 2-sulfoethyl acrylate, 2-sulfoethyl methacrylate, 3-sulfopropyl acrylate, 3-sulfopropyl methacrylate, poly(ethylene glycol) alkyl ether acrylates, poly(ethylene glycol) alkyl ether. methacrylates, poly(ethylene glycol) ethyl ether acrylates, poly(ethylene glycol) ethyl ether methacrylates and derivatives and analogs thereof. The amount of polar vinyl monomer relative to the amount of PEO may range from about 1 to about 30 weight percent of monomer to the weight of PEO. Desirably, the amount of monomer should exceed 1 weight percent in order to sufficiently improve the processability of the PEO. More desirably, the amount of monomer should be at the lower end of the above disclosed range, 1 to 20 weight percent, in order to decrease costs. A range of grafting levels is demonstrated in the Examples. Typically, the monomer addition levels were between 2.5 to 15 percent of the weight of the base PEO resin.

Desired ethylenically unsaturated polar monomers include 2-hydroxyethyl methacrylate (hereinafter HEMA), poly(ethylene glycol) methacrylates (hereinafter PEG-MA) including poly(ethylene glycol) ethyl ether methacrylate, poly(ethylene glycol) acrylates, poly(ethylene glycol) ethyl ether acrylate, poly(ethylene glycol) methacrylates with terminal hydroxyl groups, acrylic acid, maleic anhydride, itaconic acid, sodium acrylate, 3-hydroxypropyl methacrylate, acrylaride, glycidyl methacrylate, 2-bromoethyl acrylate, carboxyethyl acrylate, methacrylic acid, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) methacrylate, poly(propylene glycol) acrylate, 2-propene-1-sulfonic acid and its sodium salt, sulfo ethyl methacrylate, 3-sulfopropyl methacrylate, and 3-sulfopropyl acrylate. A particularly desired poly(ethylene glycol) methacrylate is poly(ethylene glycol) ethyl ether methacrylate. The term "poly(ethylene glycol) ethyl ether (meth)acrylate" as used herein includes both poly(ethylene glycol) ethyl ether methacrylate and poly(ethylene glycol) ethyl ether acrylate.

One commercial supplier of PEO resins is Union Carbide Chemicals & Plastic Company, Inc. Examples of suitable PEO resins available from Union Carbide include but are not limited to the resins sold under the following trade designations and reported molecular weights: POLYOX® WSR N-80, a 200,000 g/mol PEO; and POLYOX® WSR N-12K a 1,000,000 g/mol PEO. (See also POLYOX®: Water Soluble Resins, Union Carbide Chemicals & Plastic Company, Inc., 1991 which is incorporated by reference herein in its entirety.) Both PEO powder and pellets of PEO can be used in this invention since the physical form of PEO does not significantly affect its behavior in the melt for processing operations. This invention has been demonstrated by the use of PEO in powder form as supplied by Union Carbide.

In addition to the water-soluble polymer, the composites of the present invention include fillers which allow the composites to be made into precursor films which are then stretched to form porous and breathable films that are also flushable. The filler component of the composite forms the dispersed phase of the composite. The selection of a filler material is based on consideration of key parameters such as particle size, expansion and swelling efficiency, and interaction with the polymer. To prevent critical flaw formation during stretching, filler size should be, on average, 1 micron with a top cut desirably below 10 microns. Particles greater than 10 microns may result in excessive discontinuity during stretching and stress build-up in the polymer. Likewise, very fine particles of less than 0.2 microns are also not desirable during material processing because of agglomeration and increased reinforcing properties. Thus, fillers with small aspect ratios and low coupling with the polymer resin are desired.

Suitable filler materials can be organic or inorganic, and are desirably in a form of individual, discreet particles. Suitable inorganic filler materials include metal oxides, metal hydroxides, metal carbonates, metal sulfates, various kinds of clay, silica, alumina, powdered metals, glass microspheres, or vugular void-containing particles. Particularly suitable filler materials include calcium carbonate, barium sulfate, sodium carbonate, magnesium carbonate, magnesium sulfate, barium carbonate, kaolin, carbon, calcium oxide, magnesium oxide, aluminum hydroxide, and titanium dioxide. Still other inorganic fillers can include those with particles having higher aspect ratios such as talc, mica and wollastonite. Suitable organic filler materials include, for example, latex particles, particles of thermoplastic elastomers, pulp powders, wood powders, cellulose derivatives, chitin, chitozan powder, powders of highly crystalline, high melting polymers, beads of highly crosslinked polymers, organosilicone powders, and powders of super absorbent polymers, such as partially neutralized polyacrylic acid, and the like, as well as combinations and derivatives thereof. These filler materials can improve toughness, softness, opacity, vapor transport rate (breathability), water dispersability, biodegradability, fluid immobilization and absorption, skin wellness, and other beneficial attributes of the film.

Preferably, the filler is added in an amount sufficient to create a composite that can be made into precursor films. These precursor films are then made into films that are ductile and breathable.

Preferably, the filler comprises from about 10 percent to about 90 percent by weight of the precursor film. More preferably, the filler comprises from about 20 percent to about 50 percent by weight of the film. PEO resins will effectively disperse the fillers during the melt extrusion process and produce extruded strands of a uniform and smooth surface. Desirably, the average particle size of the filler material does not exceed about 10 microns, more desirably does not exceed about 8 microns, even more desirably does not exceed about 5 microns, and preferably does not exceed about 1 micron.

Suitable commercially available filler materials include the following:

1. SUPERMITE®, an ultrafine ground $CaCO_3$, which is available from ECC International of Atlanta, Ga. This material has a top cut particle size of about 8 microns and a mean particle size of about 1 micron and can be coated with a surfactant, such as Dow Corning 193 surfactant, before mixing with the polymer.

2. SUPERCOAT®, a coated ultrafine ground $CaCO_3$, which is available from ECC International of Atlanta, Ga. This material has a top cut particle size of about 8 microns and a mean particle size of about 1 micron.

3. OMYACARB® UF, high purity, ultrafine, wet ground $CaCO_3$, which is available from OMYA, Inc., of Proctor, Vt.

This material has a top cut particle size of about 4 microns and an average particle size of about 0.7 microns and provides good processability. This filler can also be coated with a surfactant such as Dow Coming 193 surfactant before mixing with the polymer.

4. OMYACARB® UFT $CaCO_3$, an ultrafine pigment surface coated with stearic acid, available from OMYA, Inc. This material has a top cut particle size of about 4 microns and a mean particle size of about 0.7 microns and provides good processability.

Sometimes it is desirable to modify the surface of the filler with a surface modifying agent to improve the surface properties of the fillers or the resulting films. The filler can be coated with liquid additives to reduce coupling at the resin-filler interface. Decoupling should facilitate debonding of filler from polymer matrix during stretching. This is especially important for the polar PEO matrix, which demonstrates strong interaction with fillers. At the same time, the coating should provide affinity to polymer resin for improved dispersion and deagglomeration. Examples of such additives include silicone glycol copolymers of different Hydrophilic-Lipophilic Balance (hereinafter HLB) numbers ranging from 0 to about 12. Such silicone glycol copolymers are available from Dow Corning Corporation. The variation in HLB number can provide controlled interaction of the coated filler with PEO. More specifically, FF-400 additive (HLB=6.6) and 193 surfactant (HLB=12) have been used to coat calcium carbonate in a solvent-surfactant solution. Filler also can be precompounded with a surfactant before mixing with PEO resin, or additive can be compounded with resin and filler at the melt-blending step. The latter method reduces effectiveness of the coating.

In addition to the water-soluble polymer and the filler, the composites, precursor films, finished films and articles produced in the present invention may optionally contain various additives such as plasticizers, processing aids, rheology modifiers, antioxidants, UV light stabilizers, pigments, colorants, slip additives, antiblock agents, etc. which may be added before or after blending with the filler.

In addition, the inorganic fillers may include water-soluble fillers including, but not limited to, magnesium sulfate, sodium sulfite, sodium hydrogen sulfite, sodium sulfate, sodium hydrogen sulfate, sodium phosphate, sodium hydrogen phosphate, sodium carbonate, sodium hydrogen carbonate, potassium carbonate, sodium hydroxide, potassium hydroxide, sodium chloride, potassium chloride, and, where applicable, hydrates thereof.

Use of water-soluble inorganic fillers provides for capture of small volumes of moisture or water vapor encountered during use to generate an area, within the film, of salt solution in which the PEO is not soluble. As a result, the strength for the intended use is maintained while structural integrity is lost upon contact with large volumes of water.

FIG. 1 sets forth one embodiment by which the composite films of the present invention may be produced. This process is designed to impart processability and stetchability to a water-soluble resin, preferably PEO, by grafting modification as described previously to produce a thermoplastic, stretchable water-soluble resin.

In the first step, the water-soluble resin is compounded with a filler in a melt mixing device to form filled PEO pellets. There are a number of melt mixing devices available for blending of the fillers into the PEO. Melt mixers, blenders, single and multi-screw extruders may be used. Twin-screw extruders are the preferred mixing device since excellent distributive and dispersive mixing are provided using this type of extruder. Additionally, counter-rotating and co-rotating twin screw extruders may also be used to make the compositions of the present invention. One example of a useful mixing device is a ZSK-30 twin-screw extruder manufactured by Werner & Pfleiderer.

There are several methods which may be used to homogeneously mix and blend the PEO and the filler into a molten state of PEO using a twin-screw extruder. In one embodiment of this invention, a dry blend or mixture of PEO powder and filler is mixed in a powder mixer, such as a double-cone rotary mixer or a cement mixer. A dry blend containing a preselected ratio between PEO and the filler is then fed to the feeding section of a twin-screw extruder. Subsequently, the PEO melts and blends with the filler particles to form a homogeneous composition. The twin-screw extruder is able to provide the desired distributive and dispersive mixing.

Another embodiment of the present invention utilizes a simultaneous feeding method. Dry PEO powder and filler are fed simultaneously to the feeding section of a twin-screw extruder, each by a separate gravimetric feeder. This mode offers flexibility and low cost to change compositions with a minimal waste of materials.

In another embodiment, the PEO dry powder is first fed to the extruder and melted. Upon it's melting, filler is fed to the PEO melt, forming a homogeneous blend upon subsequent mixing in molten phase of PEO inside the twin-screw extruder. The extruder temperatures range from the melting point of PEO to the decomposition temperature of PEO, i.e. from about 70° C. to about 230° C. Preferably, the temperature ranges from about 100° to about 220° C. More preferably, the temperature ranges from about 140° to about 200° C.

After the filled PEO pellets have been formed, they are then formed into a precursor film using a variety of techniques, including casting, blowing, or compression molding. After the precursor film has been formed, it may be pretreated. The precursor layer may be pretreated to prepare the layer for the subsequent stretching operation. The pretreatment may be done by annealing the resulting film at elevated temperatures, by spraying the polymer layer with a surface-active fluid, by modifying the physical state of the polymer with ultraviolet radiation treatment, an ultrasonic treatment, a high-energy irradiation treatment, and/or other non-direct contact treatment. In addition, the pretreatment may incorporate a combination of two or more of the foregoing techniques.

After pretreatment, the film is then stretched, as set forth below, to form the stretched film. After stretching, the film may then be delivered to a post-treatment device. This post-treatment device may provide a heat-setting or annealing operation. During the post-treatment operation, the stretched film may be held under tension at elevated temperatures. Other additional post-treatment processes or operations may be used, such as UV treatment, an ultrasonic treatment, an e-beam treatment, high energy irradiation treatment, or combinations thereof. These treatments are used to modify the state of the final stretched film.

The component materials employed to form the films having a porous structure may be suitably intermixed in powder or pellet form or otherwise combined by a conventional mixing and/or blending techniques. Desirably, the water-soluble polymer resin is mixed with the filler prior to melting. The mixture is then melt blended in a suitable apparatus, such as a blender, single screw extruder, twin-screw extruder, etc. In the Examples that follow, the process for blending the polymer resin and the fillers can also be utilized to produce the composites of the invention. Precursor films or sheets of the composites may be fabricated by convenient techniques such as compression molding and/or extrusion casting.

The precursor films of the present invention may be made by a variety of different methods. Initially, the water-soluble polymer and the filler are admixed. The admixture may then be extruded into precursor films having the filler dispersed throughout the film. Alternatively, the admixture may be extruded into pellets, which are then later extruded to form the precursor films of the present invention. The filler helps create porosity when the precursor film is stretched, which increases the breathability and water-dispersibility of the film. The pores or void spaces create additional pathways for water and/or water vapor to pass through the film, thereby increasing its breathability and water-dispersibility. Stretching may also be used to reduce the final thickness of the finished film. Stretching may be accomplished by tentering, by pantograph, by tensile testing device, by variable-speed rolls, or by hand.

Stretching allows the composite films of the present invention to have a desired breathability, water-dispersibility and/or thickness. Lower molecular weight unmodified PEO, about 200,000 g/mol or less, may be extruded into films but not stretched. These lower molecular weight PEO films have poor mechanical properties and cannot be post-processed by stretching. Higher molecular weight unmodified PEO films may be stretched, but the higher molecular weight unmodified PEO, greater than 200,000 g/mol, has a high melt viscosity and cannot be extruded into films having a thickness of less than about 7 mils. The filler allows PEO, and especially PEO which has been modified as previously discussed, to be stretched into thin films having enhanced breathability and water-dispersibility.

The composite film may be subjected to a selected plurality of stretching operations, such as uniaxial stretching operation or biaxial stretching operation. Stretching operations can provide porous film with a distinctive porous morphology, can enhance water vapor transport through the film, and can improve water access, and enhance degradability of the film,. Preferably, the film is stretched from about 100 to about 500 percent of its original length. More preferably, the film is stretched from about 100 to about 300 percent of its original length.

The key parameters during stretching operations include stretching draw ratio, stretching strain rate, and stretching temperature. During the stretching operation, the filler-filled film may optionally be heated to provide a desired stretching effectiveness.

In one particular aspect of the invention, the draw or stretching system may be constructed and arranged to generate a draw ratio which is not less than about 1.1 in the machine and/or transverse directions. The draw ratio is the ratio determined by dividing the final stretched length of the filler-filled film by the original unstretched length of the film along the direction of stretching. The draw ratio in the machine direction (MD) should not be less than about 1.1. Preferably, the draw ratio is not less than about 1.5 and more preferably is not less than about 2.0. In another aspect, the stretching draw ratio in the MD is preferably not more than about 10. More preferably, the draw ratio is not more than about 7 and even more preferably is not more than about 5.

The factors used to determine the amount of stretching may include, but are not limited to, the amount of filler used, the desired water vapor transmission rate for the film, and the desired thickness of the final film. As discussed above, PEO films have a water vapor transmission rate of about 1000 to about 2000 g/m$^2$/24 hours. By using the filler and stretching, it is possible to create PEO/filler composite films having a water vapor transmission rate of at least about 3000 g/m$^2$/24 hours.

Additionally, the thickness of the film may be modified by stretching. Preferably, films of the present invention have a thickness of less than about 5 mils. More preferably, films of the present invention have a thickness of less than about 2 mils. When the filler is admixed with the modified PEO, films having a thickness of less than about 1.0 mil are possible, while still retaining enhanced breathability and water-dispersibility of the film.

During stretching, the film sample may be optionally heated. In general, the stretching should be conducted at a temperature below the melting temperature of the polymer layer sample. In particular aspects of PEO material, the drawing temperature is preferably not more than 65° C., and more preferably not more than 55° C. Excessively high temperature may reduce the generation of the desired micropores. Stretching at lower temperature may promote a more efficient debonding of filler particles during stretching and growth of the micropores.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

In Example 1, a high strength unmodified PEO (POLYOX®WSR 12K supplied by Union Carbide) with a reported molecular weight of 1,000,000, determined by rheological measurements, was blended with calcium carbonate at a weight ratio of 55% PEO and 45% calcium carbonate. The calcium carbonate was SUPERMITEO® available from ECC International (Atlanta, Ga.).

A Haake (Paramus, N.J.) extruder was used to produce pellets from the PEO powder. The Haake extruder was a counter-rotating twin-screw extruder that contained a pair of custom-made conical screws. Each conical screw had a diameter of 30 mm at the feed port and a diameter of 20 mm at the die. The extruder was fitted with a two-strand die attachment. The temperature profile for the heating zones was set at 100, 140, 170 and 180° C. for zones 1 to 4, respectively. The screw speed was set at 150 rpm. The strands were air-cooled on a conveyor belt and pelletized.

The unmodified, extruded PEO pellets were processed into films in the Haake extruder described above with a 4 inch wide film die attachment. The temperature profile for the heating zones of the Haake extruder was 160, 190, 200 and 200° C. The screw speed was adjusted in the range of 50–150 rpm depending on the film thickness attempted. The process was allowed to stabilize before film samples were collected. The extruded films were cast onto a chilled roll maintained at 15–20° C., and then collected on a wind-up roll.

The mechanical properties of the films of the examples were determined using a Sintech tensile tester (SINTECH 1/D) and Testworks 3.03 software. The tensile tester is a device available from MTS System Co., a business having offices located in Cary, N.C. The software is also available from MTS System Co., Sintech Division. Equipment and software having substantially equivalent capabilities may also be employed. Mechanical properties were evaluated according to ASTM Test Method D638-95 with the tensile tester using its strip-testing configuration. The testing was conducted with a 50 pound load cell, and air actuated, rubber coated 3 inch grips. The film testing was conducted with a 1 inch gauge length and a 5 inch/min crosshead speed. An individual film sample was loaded perpendicular to and in the center of the grips, and was held in place when air pressure closes the grips together. The thickness of the film was input by the user before beginning the tensile testing. In each experiment, the film was stretched until breakage occurs, and the equipment software or other equipment programming creates a stress-versus-strain plot and calculates the desired mechanical properties for the sample. The film thickness, yield stress, stress-at-break, strain-at-break, and tensile modulus are reported in Table 1.

Surprisingly, with filler incorporation in the unmodified PEO resin, film processability was improved.

Example 2

In Example 2, the high-strength PEO from Example 1 was blended with the calcium carbonate of Example 1, having a silicone glycol copolymer surface modifier. The PEO was blended with the surface-modified calcium carbonate in a ratio of 55% PEO to 45% surface-modified calcium carbonate, by weight. The calcium carbonate was coated with FF-400 silicone glycol copolymer surface modifier, supplied by Dow Corning (Midland, Mich.), prior to blending with the PEO. The amount of FF-400 surface modifier added was about 6% by weight relative to the modified filler weight.

The PEO/surface-modified calcium carbonate composite blend was processed into pellets and then films using the Haake extruder and operating parameters set forth in Example 1. Using the surface-modified calcium carbonate, film processability improved compared to Example 1.

The tensile properties of the PEO/surface-modified calcium carbonate composite films were tested using the Sintech tensile tester testing procedures set forth in Example 1. The results for the PEO/surface-modified calcium carbonate films are listed in Table 1.

The films of the present invention were also tested to determine the water vapor transmission rate (WVTR). The films of the present invention are designed to be breathable, such that water vapor will pass through the film. Therefore, any water will not be trapped against the skin of an individual, but rather will pass through the film and into the environment, therefore making the film more comfortable to wear than prior art multi-layer films and also helping to promote skin wellness. The WVTR values for the film materials were calculated in accordance with ASTM Standard E96-80. Circular samples measuring 3 inches in diameter were cut from each of the test materials and a control of CELGARD®2500 microporous film which was available from Hoechst Celanese Corporation. Individual samples of the test materials and a control material were placed across the open tops of the individual vapometer cups containing one hundred milliliters of distilled water. The screw-on flanges were tightened to form a seal along the edges of the cup. The cups were placed in a convection type oven set at 100° F. The relative humidity within the oven was not specifically controlled. The cups were first weighed and then immediately placed into the oven. After 24 hours, the cups were removed from the oven and weighed again. The WVTR of each material was calculated based on the weight loss and WVTR of the control film, assuming the WVTR of the CELGARD®2500 microporous film to be 5000 g/sq.m/ 24 hr under predetermined set conditions. A specific water vapor transmission rate per 1 mil was calculated by multiplying a measured WVTR by the film thickness. The breathability of the film is also set forth in Table 1. However, the film thickness could not be reduced to less than 7 mil. WVTR was 1272 g/m$^2$/24 hr.

Comparative Example 1

In Comparative Example 1, a high strength unmodified PEO (POLYOX®WSR 12K supplied by Union Carbide) with a reported molecular weight of 1,000,000, determined by rheological measurements, was used without filler.

A Haake (Paramus, N.J.) extruder was used to produce pellets from the PEO powder. The Haake extruder was a counter-rotating twin-screw extruder that contained a pair of custom-made conical screws. Each conical screw had a diameter of 30 mm at the feed port and a diameter of 20 mm at the die. The extruder was fitted with a two-strand die attachment. The temperature profile for the heating zones was set at 100, 140, 170 and 180° C. for zones 1 to 4, respectively. The screw speed was set at 150 rpm. The strands were air-cooled on a conveyor belt and pelletized.

The unmodified, extruded PEO pellets were processed into films in the Haake extruder described above with a 4 inch wide film die attachment. The temperature profile for the heating zones of the Haake extruder was 160, 190, 200 and 200° C. The screw speed was adjusted in the range of 50–150 rpm depending on the film thickness attempted. The process was allowed to stabilize so that film samples could be collected and observed. The extruded films were cast onto a chilled roll maintained at 15–20° C. and collected on a wind-up roll.

The mechanical properties of the films of the examples were determined using the testing procedures set forth in Example 1. The film thickness, yield stress, stress-at-break, strain-at-break, and tensile modulus are reported in Table 2.

Comparative Example 2

In Comparative Example 2, a low-strength PEO (POLYOXO®WSR N-80 from Union Carbide) with a reported molecular weight of 200,000, determined by rheological measurements, was used without filler.

The unmodified low-strength PEO was extruded into pellets and then films using the Haake extruder and operating parameters set forth in Example 1. The tensile properties were also determined using the procedures set forth in Example 1 and the results are listed in Table 2.

The strain-at-break and stress-at-break of the Comparative Example 1 film were respectively 1370% and 16.8 MPa, which is significantly higher than the Comparative Example 2 film. For the Comparative Example 1 film, the yield stress was 8 MPa, while the stress-at-break was 16.8 MPa. This makes the Comparative Example 1 film highly desirable for stretching applications, while the tensile properties for the Comparative Example 2 film are not desirable for stretching applications. Thus, Comparative Example 2 was not filled or stretched in any application.

Comparative Example 3

Figure 2:
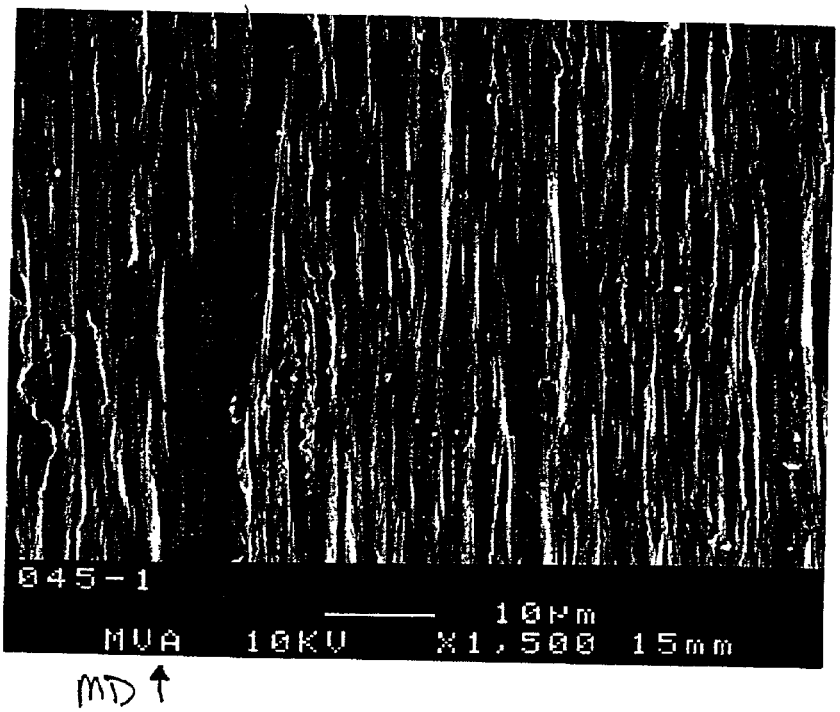
FIG. 2 shows a photomicrograph of a film made according to Comparative Example 1.

The modified PEO resin used in Examples 3–5, which are set forth hereafter, was cast into a film using a Haake twin-screw extruder. The temperatures of the heating zones were set at 170° C. Screw speeds were adjusted from 15 to 50 rpm to obtain a film of desired thickness. The film properties are listed in Table 2. The film was stretched to 80% of strain-at-break to produce a film. An SEM micrograph for the stretched non-porous film in Comparative Example 3 is shown in FIG. 2. No micropores were observed in the micrograph. These results demonstrate that the fillers are necessary for the creation of the micropores within the grafted, water-soluble PEO-based films.

Example 3

In Example 3, a modified PEO resin was used. The modified PEO resin comprised PEO (POLYOX®N-205 having a molecular weight of about 600,000 g/mol.) having a polar vinyl monomer, more specifically 2-hydroxyethyl methacrylate (2-HEMA), grafted onto the PEO. The amount of 2-HEMA was 1.5% by weight of the PEO. The PEO was modified in accordance with the methods set forth in U.S. Ser. No. 09/002,197, which has already been incorporated herein by reference.

The grafted PEO was admixed with calcium carbonate at a weight ratio of 90% grafted PEO and 10% calcium carbonate. The grafted PEO and calcium carbonate were compounded in a ZSK-30 twin-screw extruder manufactured by Werner & Pfeiderer (Ramsey, N.J.). The ZSK-30 extruder was a co-rotating twin-screw extruder with a screw diameter of 30 mm. The length of the extruder was 1338 mm. The extruder had 14 barrels. The first barrel was not heated but was instead cooled by water. The modified PEO was fed to the extruder by a gravimetric feeder to the feeding section (barrel #1) of the extruder. The SUPERMITE® filler was also fed to the feeding section of the extruder using a separate gravimetric feeder. The feeding rates for the grafted PEO and the calcium carbonate were 18 lbs/hr and 2 lbs/hr respectively. The extruder temperatures were set at 180° C. for the heated barrels. The screw speed was 300 rpm.

The blended resins of grafted PEO and calcium carbonate were cast into film on a Haake twin-screw extruder. The temperatures of the heating zones were set at 170° C. Screw speeds from about 15 to 50 rpm were used to cast the film to obtain the desired film thickness.

The tensile properties for this film were determined using the procedure set forth in Example 1 and the results are listed in Table 1.

Example 4

In Example 4, the grafted PEO from Example 3 was blended with calcium carbonate at a weight ratio of 80%, PEO and 20% calcium carbonate. The calcium carbonate was SUPERMITE® available from ECC International. The grafted PEO and calcium carbonate were fed to a ZSK-30 extruder at feeding rates of 16 lbs/hr and 4 lbs/hr respectively. The other process conditions were the same as those set forth in Example 3. The tensile properties for this film were determined using the procedure set forth in Example 1 and the results are listed in Table 1.

Example 5

In Example 5, the grafted PEO from Example 3 was blended with calcium carbonate at a weight ratio of 70% PEO and 30% calcium carbonate. The calcium carbonate was SUPERMITE® available from ECC International. The grafted PEO and calcium carbonate were fed to a ZSK-30 extruder at feeding rates of 14 lbs/hr and 6 lbs/hr respectively. The other process conditions were the same as those set forth in Example 3. The tensile properties for this film were determined using the procedure set forth in Example 1 and the results are listed in Table 1.

Example 6

In Example 6, a medium molecular weight PEO (POLYOX® N-750 having a molecular weight of about 300,000 g/mol.) was compounded with a water soluble filler, sodium carbonate, at a weight ratio of PEO to filler of 10:1. The composition was extruded into pellets and then into films using the Haake twin-screw extruder and operating parameters set forth in Example 1 with a slight change in the temperature profile for heating. The temperature profile for the heating zones was set at 100° C., 150° C., 170° C., and 180° C. for zones 1 to 4 respectively. The tensile properties and breathability were determined using the procedures set forth in Example 1 and the results are listed in Table 1.

TABLE 1

| | | Unstretched Filled PEO Precursor Films | | | | | |
|---|---|---|---|---|---|---|---|
| Film | Film Thickness (mil) | Yield Stress (MPa) | Stress-at-Break (MPa) | Strain-at-Break MD (%) | Peak Stress MD (MPa) | Modulus MD (MPa) | Breathability (g/m²/24 hr) |
| Example 1 | 13.8 | 12.0 | 9.5 | 450 | — | 335 | — |
| Example 2 | 11.0 | 8.5 | 8.2 | 445 | — | 271 | 1272 |
| Example 3 | 0.4 | — | — | 710 | 22.7 | 234 | — |
| Example 4 | 1.1 | — | — | 610 | 15.1 | 147 | — |
| Example 5 | 1.3 | — | — | 320 | 9.5 | 220 | — |
| Example 6 | 8.3 | 7.0 | 8.4 | 597 | — | 169 | 1327 |

TABLE 2

Plain Unfilled PEO Films

| Film | Film Thickness (mil) | Yield Stress (MPa) | Stress-at-Break (MPa) | Strain-at-Break MD (%) | Peak Stress MD (MPa) | Modulus MD (MPa) |
|---|---|---|---|---|---|---|
| Comparative Example 1 | 6 | 8.0 | 16.8 | 1370 | — | 134 |
| Comparative Example 2 | 5.7 | 10.7 | 7.2 | 160 | — | 250 |
| Comparative Example 3 | 3.6 | — | — | 1260 | 37 | 173 |

Example 7–11

In Example 7, the advantages of stretching were also tested using the films of Example 1. When the filled film was stretched unidirectionally up to 300% and then immersed in water, it immediately lost its structural integrity and disintegrated into very fine pieces. The unstretched films, although still flushable, demonstrated relatively slow dissolution in water with the formation of a sticky surface layer. These findings can have significant impact on the development of rapidly disintegradable, breathable structural elements for the flushable personal care products.

The water vapor transmission rate (WVTR) of the stretched film of Example 1 was measured in accordance with ASTM F-1249 by MOCON® Testing Services (Minneapolis, Minn.). The test conditions were: temperature–37° C.; relative humidity (RH) –90% on 1 side of film and 0% on the other side. The average WVTR was 9300 g/m$^2$/24 hr. based on duplicates measurement. For comparison, the WVTR of an unstretched PEO film without filler measured using the same test method was reported to be 850 g/m$^2$/24 hr. This demonstrates that the filler and stretching resulted in a greater than tenfold increase in WVTR. It is believed that the high WVTR of this film is associated with the highly porous-surface-open morphology of the film.

Example 8

In Example 8, the advantages of stretching were also tested using the films of Example 2. When the filled film was stretched unidirectionally up to 300% and then immersed in water, it immediately lost its structural integrity and disintegrated into very fine pieces. The unstretched films, although still flushable, demonstrated relatively slow dissolution in water with the formation of a sticky surface layer.

Example 9

In Example 9, the film from Example 3 was stretched unidirectionally on a Sintech tester to 80% of strain-at-break to produce a microporous film.

Figure 3:
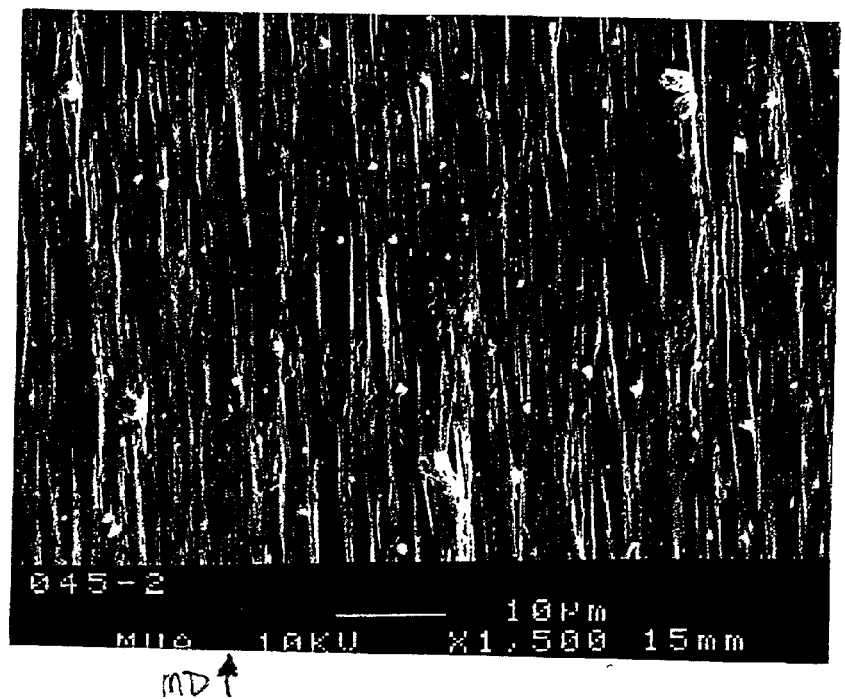
FIG. 3 shows a photomicrograph of a film made according to Example 11.

A scanning electron microscopy (SEM) micrograph of this film is shown in FIG. 3. The surface of the film was sputter coated with about 200 Angstroms of a gold/palladium alloy. SEM images were acquired in a JEOL 6400 SEM using a secondary electrons signal at a 10 kV operating voltage. As can be seen, unidirectional aligned micropores around the filler particles were observed. These pores increase the breathability of the water-soluble, grafted PEO film.

Figure 4:
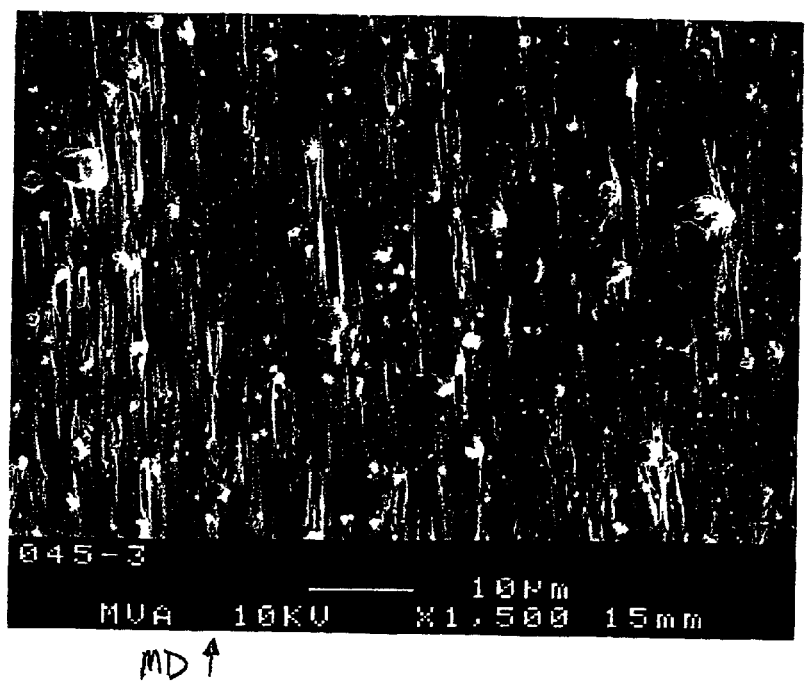
FIG. 4 shows a photomicrograph of a film made according to Example 12.

Example 10,

In Example 10, the from Example 4 film was stretched unidirectionally on a Sintech tester to 80% of strain-at-break to produce a microporous film. The stretched film of Example 10 had increased breathability and water-dissolution rate due to a more open structure. Additionally, as shown in FIG. 4, an SEM micrograph of the film of Example 10 shows an increase in the number and the size of pores from the film of Example 9. The breathability of the water-soluble, grafted PEO films was therefore increased.

Figure 5:
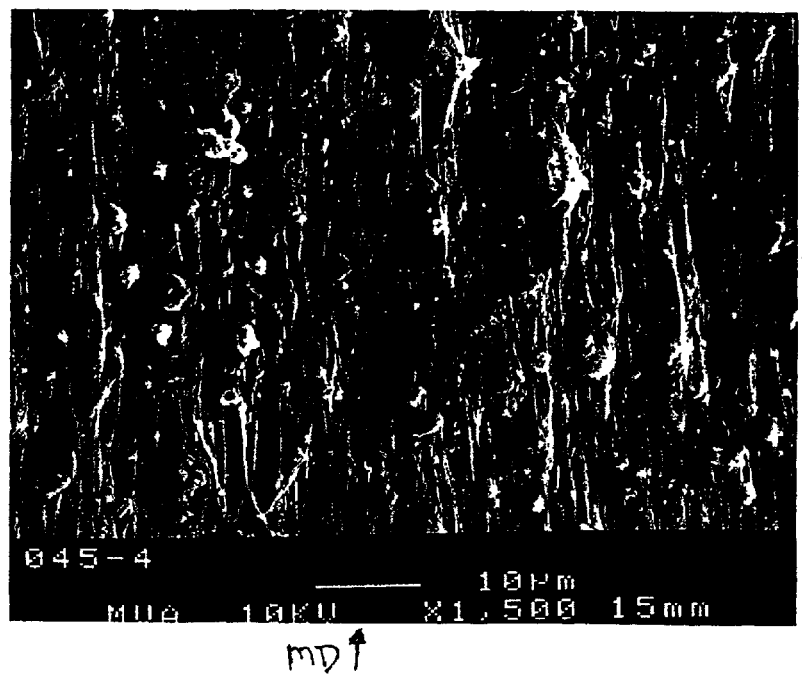
FIG. 5 shows a photomicrograph of a film made according to Example 13.
Figure 6:
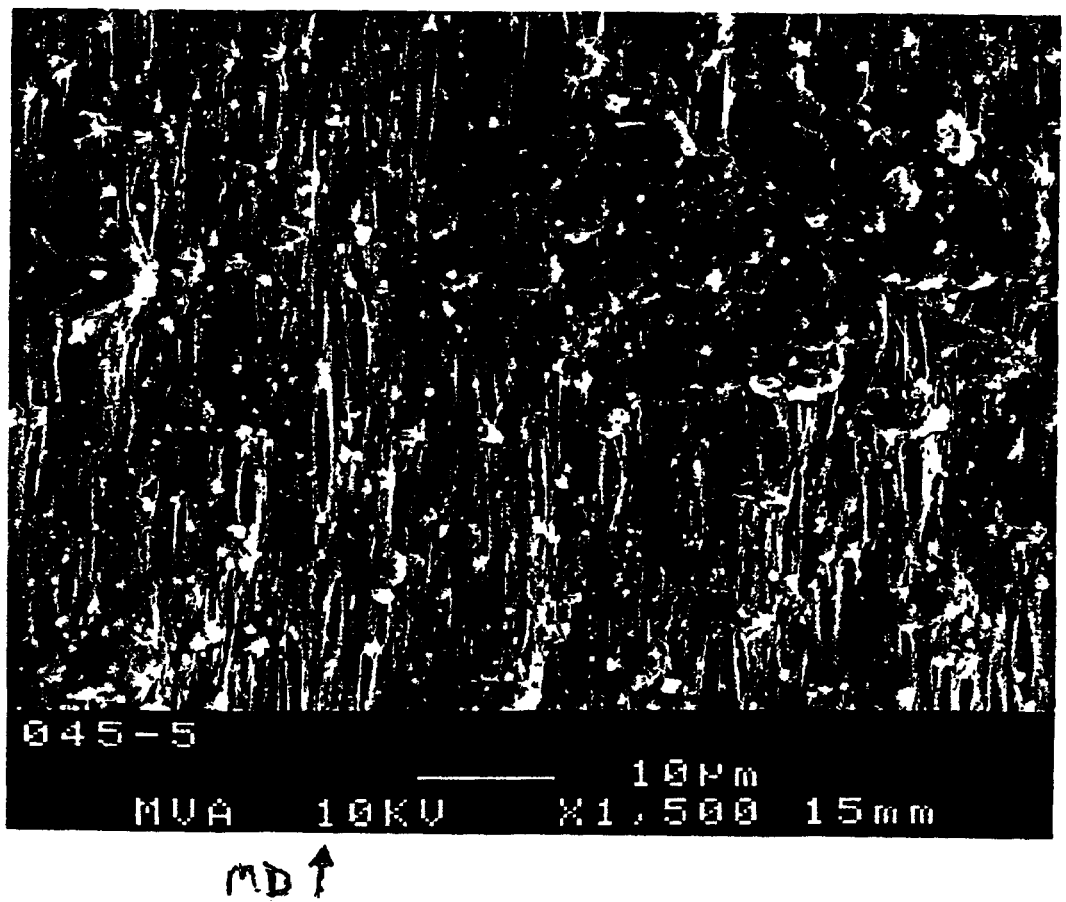
FIG. 6 shows a photomnicrograph of a film made according to Example 14.

Example 11,

In Example 11, the film from Example 5 was stretched unidirectionally on a Sintech tester to 80% of strain-at-break to produce a microporous film. The stretched film of Example 11 had increased breathability and water-dissolution rate due to a more open structure. Additionally, as shown in FIG. 5, an SEM micrograph of the film of Example 11 shows an increase in the number and the size of pores from the film of Example 10. The breathability of the water-soluble, grafted PEO films was therefore increased.

Therefore, these Examples have shown that the water-soluble polymer/filler composites of the present invention may be formed into porous, ductile films which have enhanced water vapor transmission rates and excellent water-dispersibility. This permits these films to be used in a variety of flushable personal care articles. It should be noted that in the foregoing examples, while the unmodified PEO and the PEO/inorganic composites were first extruded into pellets, these resins and composites could have been formed directly into films without prior pelletization. However, pelletization aids in the processability of the resins and composites into films.

What is claimed is:

1. A porous, flushable, ductile, breathable film, wherein the film is formed from an extruded precursor film, the extruded precursor film comprising a homogeneous blend of a water-soluble polymer having a molecular weight from about 200,000 g/mol to about 8,000,000 g/mol and a particulate filler, wherein the filler comprises at least 10 percent by weight of the precursor film, and the precursor film having an elongation-at-break of greater than about 150%, further wherein the precursor film, when stretched, forms pores around the particulate filler thereby increasing the breathability of the breathable film; further wherein the water-soluble polymer is selected from poly(ethylene oxide) or modified poly(ethylene oxide) that comprises poly (ethylene oxide) having from about 1% to about 30% by weight of grafted polar vinyl monomer.

2. The film of claim 1, wherein said polar vinyl monomer is selected from the group consisting of acrylates, methacrylates, 2-hydroxyethyl acrylate, 2-hydroxyethyl methacrylate, poly(ethylene glycol) acrylates, poly(ethylene glycol) methacrylates, poly(ethylene glycol) diacrylates, acrylic acid, methacrylic acid, maleic anhydride, itaconic acid, acrylamide, glycidyl methacrylate, 2-bromoethyl acrylate, 2-bromoethyl methacrylate, carboxyethyl acrylate, sodium acrylate, 3-hydroxypropyl methacrylate, 3-hydroxypropyl acrylate, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) acrylates, poly(propylene glycol) methacrylates 2-propene-l-sulfonic acid and its sodium salt, 2-sulfoethyl acrylate, 2-sulfoethyl methacrylate, 3-sulfopropyl acrylate, 3-sulfopropoyl methacrylate, poly (ethylene glycol) alkyl ether acrylates, poly(ethylene glycol) alkyl ether methacrylates, poly(ethylene glycol) ethyl ether acrylates, poly(ethylene glycol) ethyl ether methacrylates and derivatives and analogs thereof.

3. The film of claim 1, wherein water soluble polymer has a molecular weight from about 200,000 g/mol to about 1,000,000 g/mol.

4. The film of claim 1, wherein the filler is selected from clay, silica, alumina, powdered metals, glass microspheres, calcium carbonate, barium sulfate, sodium carbonate, magnesium carbonate, magnesium sulfate, barium carbonate, kaolin, carbon, calcium oxide, magnesium oxide, aluminum hydroxide, titanium dioxide, talc, mica, wollastonite, latex particles, particles of thermoplastic elastomers, pulp powders, wood powders, cellulose derivatives, chitin, chitozan powder, organosilicone powders, polyacrylic acid, magnesium sulfate, sodium sulfite, sodium hydrogen sulfite, sodium sulfate, sodium hydrogen sulfate, sodium phosphate, sodium hydrogen phosphate, sodium carbonate, sodium hydrogen carbonate, potassium carbonate, sodium hydroxide, potassium hydroxide, sodium chloride, potassium chloride, or mixtures thereof.

5. The film of claim 1, wherein the filler comprises calcium carbonate.

6. The film of claim 1, wherein the filler comprises calcium carbonate with a surface coating material.

7. The film of claim 6, wherein the surface coating material is a liquid organosilicone with a Hydrophilic-Lipophilic Balance number of from about 6 to about 12.

8. The film of claim 1, wherein the filler comprises from about 20 to about 50 percent by weight of the film.

9. The film of claim 1, wherein the film has a thickness of from about 0.01 to about 15 mils.

10. The film of claim 1, wherein the film has a thickness of from about 0.01 to about 2 mils.

11. The film of claim 1, wherein precursor film has an elongation-at-break of greater than about 200%.

12. The film of claim 1, wherein the filler material has an average particle size that does not exceed about 10 microns.

13. The film of claim 1, wherein the filler material has an average particle size that does not exceed about 8 microns.

14. The film of claim 1, wherein the filler material has an average particle size that does not exceed about 5 microns.

15. The film of claim 1, wherein the filler material has an average particle size that does not exceed about 1 micron.

16. A flushable article comprising:
  a. a porous, flushable, ductile, breathable film formed from an extruded precursor film, the extruded precursor film comprising a homogeneous blend of a water-soluble polymer and a particulate filler, wherein the filler comprises at least 10 percent by weight of the precursor film, and the precursor film having an elongation-at-break of greater than about 150%, further wherein the precursor film, when stretched, forms pores around the particulate filler thereby increasing the breathability of the breathable film; further wherein the water-soluble polymer is selected from poly(ethylene oxide) or modified poly(ethylene oxide); and
  b. at least one additional layer adhered to the flushable, ductile, breathable film, wherein the article comprises a flushable personal care article, a diaper, a feminine pad, a pantiliner or training pants.

\* \* \* \* \*